March 29, 1955 J. H. BOULET 2,704,892
MICROMETRIC DIVIDERS
Filed Dec. 23, 1953
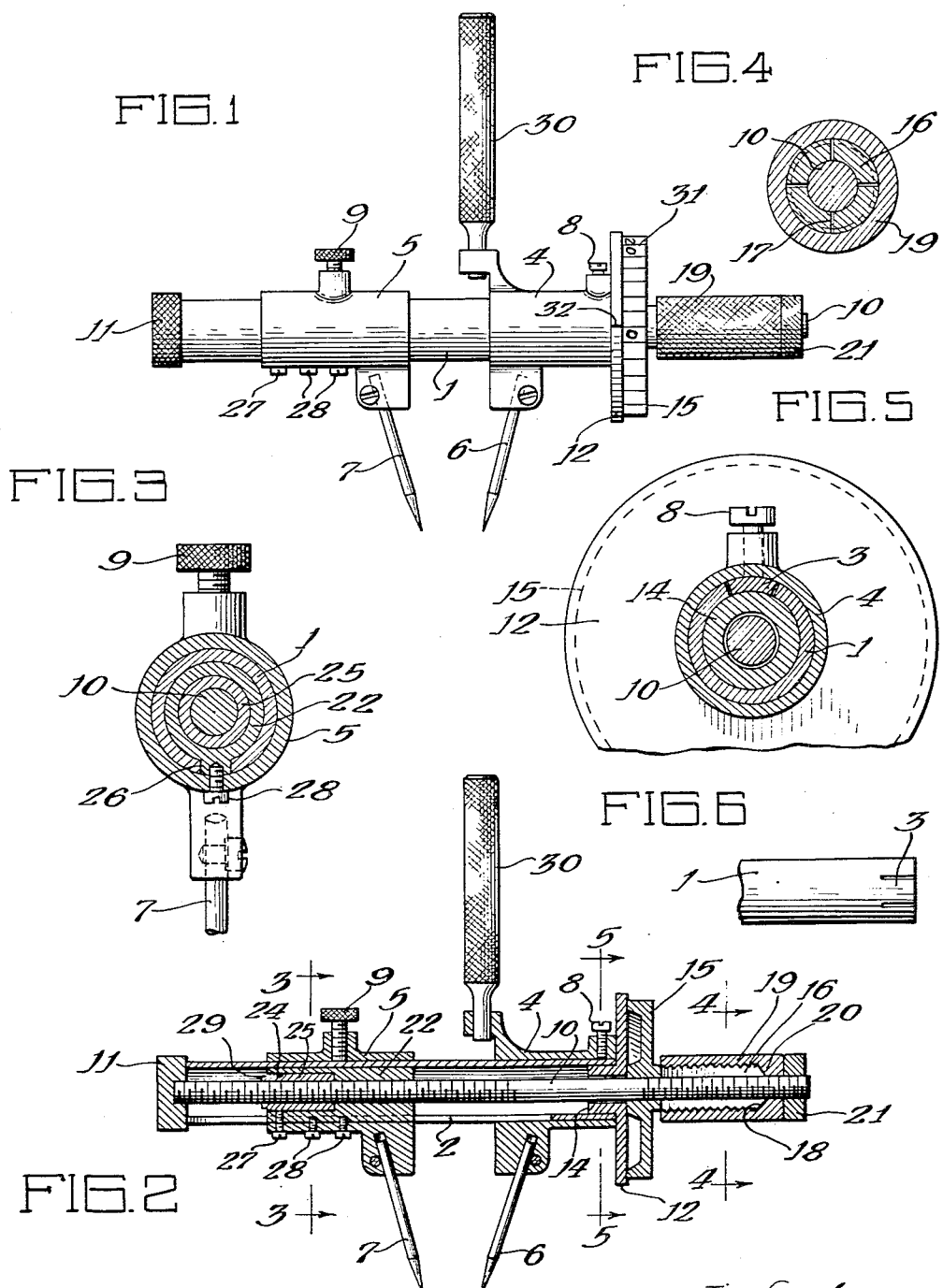
Inventor:
Joseph H. Boulet
By: Wm F. Freudenreich,
Attorney.

United States Patent Office 2,704,892
Patented Mar. 29, 1955

2,704,892

MICROMETRIC DIVIDERS

Joseph H. Boulet, Hinsdale, Ill.

Application December 23, 1953, Serial No. 399,958

6 Claims. (Cl. 33—164)

The present invention relates to small precision instruments of the dividers type for use in metal machining where great accuracy is essential, and great difficulty has heretofore been experienced in manufacturing instruments that are satisfactory initially and which can thereafter be maintained in perfect condition. The points of a pair of dividers must come in contact with metal in making measurements and must cut into metal in describing lines, arcs or circles or when simply marking a point on the metal. This makes it very difficult to prevent such instruments from wearing out quickly.

It is the object of the present invention to create a small instrument of the dividers type that is so sturdy that its micrometer readings are accurate and reliable even when minute circles are inscribed or tiny distances are measured; and which can be adjusted quickly and easily initially and to compensate for wear or because of a difference between the divider points, that must be replaced from time to time, or for other reasons.

In carrying out my invention I employ a body member in the form of a slotted, open-ended tube through which extends an axial screwthreaded rod. On one end of this tube is a stationary point carrier, while a movable carrier is slidably mounted on the tube. The movable carrier is driven by a nut device on the rod within the tube; this device being secured to the carrier by elements passing through and slidable along the slot. The nut device is made adjustable to take up slack in the screw drive. The screw rod is provided with means to turn it, and with one disc of a two-disc device for giving accurate readings as to distance traveled by the movable carrier during a complete revolution, or any part of a revolution, made by the screw rod. Means are also provided to adjust the two discs angularly relative to each other to ensure that the micrometer reading will be zero when the divider points are touching each other.

The various features of novelty whereby the present invention is characterized will hereinafter be pointed out with particularity in the claims; but, for a full understanding of the invention and of its objects and advantages, reference may be had to the following detailed description taken in connection with the accompanying drawing, wherein:

Figure 1 is a front view of a preferred embodiment of the invention;

Fig. 2 is a vertical longitudinal section through the instrument shown in Fig. 1;

Fig. 3 is a section, on a larger scale, on line 3—3 of Fig. 2;

Figs. 4 and 5 are sections on the same scale as Fig. 3, on lines 4—4 and 5—5, respectively, of Fig. 2; and Fig. 6 is a top plan view of one end of the tubular body, on the same scale as Figs. 1 and 2.

Referring to the drawing, 1 represents a body member in the form of an open-ended tube of any desired length. For most purposes a length of about two inches is preferred. The tube contains a slot 2 opening out through one end of the same and extending parallel to the axis of the tube to within a short distance from the second end. The tube is slitted at said second end to create a short tongue the outer end of which is free.

Mounted on the body member are two carriers 4 and 5 for divider points 6 and 7, respectively. These carriers are in the form of sleeves surrounding the tube. Carrier 4 is locked to the tube, so as to remain stationary, by a set screw 8 that passes through the wall thereof and bears against the tongue 3. Carrier 5 is slidable along the tube, but may be locked against movement thereon by a set screw 9 that has a knurled head to permit it to be easily turned by hand.

Extending axially of the tube, throughout the length thereof and protruding from one end, namely the end at which tongue 3 is located, is a screw device in the form of a threaded rod 10. The non-protruding end of the screw device is screwed or tightly forced into a cap nut 11 that engages the adjacent end of the tube.

Surrounding and loose on the protruding end of the rod is a disc 12 that has a diameter about three times as great as that of the tube. This disc is provided with a hub 14 that fits into the tube. This disc is secured to the tube by the same screw 8 that holds carrier 4 in place; this screw pressing tongue 3 firmly against hub 14.

A second disc 15 surrounds and is slidable on the screwthreaded rod outwardly from and in contact with disc 12. This second disc has a long hub 16 slitted lengthwise, as best seen in Fig. 4, where four slits are shown. The free end 18 of this hub is tapered or frusto-conical. The second disc is locked to the rod by means of a little, externally knurled barrel 19 screwed onto hub 16. This barrel may be applied before or after disc 15 engages the other disc and the rod has been pulled out until nut 11 is in contact with the opposite end of the body member. The bore in the barrel contains a tapered or frusto-conical section 20 complementary to surface 18 at the end of the hub. Therefore, when the barrel is screwed tightly onto the hub, the frusto-conical section 20 of its bore causes the split hub 16 to contract and be clamped tightly against the screwthreads on rod 10; the sharp ridges of the screw biting into the material of which the hub is composed and increasing the gripping action. A suitable lock nut 21, on the rod and engaged with the outer end of barrel 19, in turn locks the barrel against turning.

Within and slidable lengthwise of the tubular body is a long cylindrical sleeve nut member 22 screwed onto the rod. The screw threads in this member extend through only one half the length of the same, the other half, 24, of the bore being smooth and of larger diameter than the screwthreaded part. In this smooth bore section is a second sleeve nut 25 which is a sliding fit therein. The main nut member has an external rib 26 extending throughout the length thereof and fitting slidably into the slot in the tubular body. A set screw 27, as best shown in Fig. 2, extends through the wall of carrier 5 and through rib 26 into engagement with nut 25 to lock the two nuts together. Other set screws 28, extend through the wall of carrier 5 and into rib 26, to secure the main sleeve nut to the carrier.

The exposed end of nut 25 is provided with a kerf 29 into which some thin, blade-like part may be inserted to turn the same through any desired angle after set screw 27 has been loosened.

Carrier 4 is provided with a vertical stem or handle 30 the axis of which, extended downwardly, intersects the tip of point 6 on this carrier.

When point 6 is made very slightly longer than the other point, it may penetrate metal to a sufficient depth to permit a circle or an arc to be inscribed by the other point when the instrument is used as a compass.

Disc 15 has graduations 31 distributed over its entire periphery, whereas disc 12 has on its periphery a hair line or mark 32 for cooperation with said graduations to provide micrometer readings.

The manner of using the instrument requires no further explanation except to clarify the purpose of some of the features that make adjustments possible. Thus the two sleeve nuts enable the user to compensate for any appreciable wear on the threads on the rod and/or the sleeve units. In the case of insipient wear it is only necessary to disassemble the instrument sufficiently to enable one to turn sleeve nut 25 through a small angle. This causes the thread in the main nut to engage with one slope of the valley on the screwthreaded rod, while the thread in the second nut engages with the opposite slope of such valley; producing the same effect as though no wear had taken place.

The second feature having to do with adjustment of the instrument is the manner of mounting disc 12.

When the points of the instrument are touching each other, hair line 32 must register with the zero mark on disc 15. This setting is easily achieved in the manufacture of the instrument, because disc 12 may be turned at will with set screw 8 backed off. During the use of the instrument new points may replace the original points and upset the calibration of the instrument. In that case one need only unlock disc 12 and, with the points touching each other, shift this disc until the mark thereon registers with zero on the other disc, to insure correct micrometer readings.

While I have illustrated and described with particularity only a single form of my invention, I do not desire to be limited to the exact details thus illustrated and described; but intend to cover all forms and arrangements coming within the definitions of my invention constituting the appended claims.

I claim:

1. In a micrometric instrument of the dividers type, an elongated tubular body, stationary and a movable point carriers on said body, a screw device extending throughout the length and axially of the body, means on one end of the screw device for turning the same, said body containing in the wall a longitudinal slot, a sleeve nut much shorter than said body surrounding the screw device and having a rib fitting slidably in the slot, the sleeve nut having in one end a smooth axial bore, a second sleeve nut fitting into said bore, a set screw in the first mentioned sleeve nut and engaging the second nut to lock the two nuts together, and means securing the movable point carrier to said rib.

2. In a micrometric instrument of the dividers type, an elongated tubular body, stationary and a movable point carriers on said body, a screw device extending throughout the length and axially of the body, means on one end of the screw device for turning the same, said body containing in the wall a longitudinal slot, a sleeve nut much shorter than said body surrounding the screw device and having a rib fitting slidably in the slot, said nut having in one end a smooth axial bore, a second sleeve nut fitting in said bore, screws securing the movable carrier to said rib, and one of the latter screws extending into said bore and engaging the second nut.

3. In a micrometric instrument of the dividers type, an elongated tubular body having thereon a stationary point carrier and a movable point carrier, means, including an elongated screw device protruding from one end of the body, to shift the movable carrier, a disc having a hub fitting into said end of the body, a set screw to lock the disc in any angular position into which it may be placed, a second disc secured to the screw device in contact with the first disc, and one of the discs having thereon peripheral graduations while the other disc is provided with a mark cooperating with the graduations to provide micrometer readings.

4. An instrument as set forth in claim 3, wherein the tubular body member contains slits defining a tongue that under-lies the set screw and is adapted to be pressed by the latter against the hub on the first mentioned disc.

5. An instrument as set forth in claim 3, wherein the tubular body contains slits defining a tongue that underlies the set screw, and wherein the set screw passes through a part on the stationary carrier and serves to hold that carrier against movement.

6. In a micrometric instrument of the dividers type, a body member in the form of an open-ended tube containing a slot that extends lengthwise thereof through one end to within a short distance of the second end, a long screwthreaded rod extending through the tube and protruding from said second end, a cap nut bearing against the first end of the tube and screwed onto the adjacent end of the rod, a disc of larger diameter than the tube having a hub fitting into and held against turning in the second end of the tube, means on the protruding end of the rod to turn the same, such means including a second disc in contact with the first disc, the discs having cooperating markings to provide micrometer readings, a stationary point carrier on the tube adjacent to the discs, a movable point carrier slidable along the tube, a nut on the rod within the tube, and connecting means, extending into and slidable along said slot, between the nut and the movable carrier.

References Cited in the file of this patent

UNITED STATES PATENTS

| | | |
|---|---|---|
| 535,521 | Williamson | Mar. 12, 1895 |
| 557,445 | Spalding | Mar. 31, 1896 |
| 718,923 | Ellsworth | Jan. 20, 1903 |
| 1,856,824 | Alvey | May 3, 1932 |
| 2,252,146 | Walsh | Aug. 12, 1941 |